Patented Jan. 4, 1949

2,458,222

UNITED STATES PATENT OFFICE 2,458,222

MANUFACTURE OF ARTIFICIAL AQUEOUS DISPERSIONS OF NATURAL AND SYNTHETIC RUBBERS, RUBBER SUBSTITUTES, AND RUBBERLIKE SUBSTANCES

Naum Talalay, Bedford, England

No Drawing. Application December 29, 1944, Serial No. 570,463. In Great Britain April 20, 1944

5 Claims. (Cl. 260—29.7)

This invention relates to the manufacture of artificial aqueous dispersions of organic, thermoplastic, rubber-like materials, such as natural and synthetic rubbers, e. g. pale crepe, smoked sheet, guayule, niger, GR-S (bunas), GR-I (butyl rubbers), GRN (neoprenes), GRP (thiokols), and the like, their reclaims, and their cured and uncured wastes.

Artificial aqueous dispersions of some such substances are commonly made by milling the material to be dispersed until plastic (after reclaiming it if and when necessary), transferring the plasticized stock to an internal mixer and masticating it with addition of a hydrophilic colloid and water until it ceases to be the continuous phase and becomes dispersed in the aqueous medium.

Alternatively, it is possible to carry out the required plastication and in cases where necessary—such as when using cured waste—the reclaiming operation in one and the same machine as the dispersing operations, thus avoiding the rather cumbersome transfer of the material to be dispersed between the operational stages of the process.

Three types of hydrophilic substances are commonly used today in the manufacture of such dispersions, namely collodial clays, proteins and soaps.

It is often undesirable however to have either clays or large amounts of proteins, such as casein in dispersions thus produced—particularly if they are to be mixed with natural latices—and the soaps which are used, i. e. soaps made by the interaction of higher aliphatic acids, and alkali hydroxides (KOH, NaOH, or NH4OH) produce, as a rule, dispersions of exceedingly high viscosity at concentrations of 45% total solids content or over. Moreover, such highly viscous dispersions made with these soaps mix with difficulty with natural latices producing often undesirable thickening and sometimes even coagulation.

According to the present invention, the materials above mentioned are dispersed in the usual way by means of a soap the acid radical of which is however saponified, not by an alkali hydroxide such as KOH, NaOH or NH4OH, but by an organic base, such as an aliphatic or aromatic amine or their derivatives or mixtures of such bases and/or their derivatives, in conjunction with an alkali metal silicate and/or borate (such as, e. g. sodium or potassium silicate or borax) and/or an inorganic alkali metal hydroxide.

A large variety of organic bases of the character above referred to is available and the following are given by way of example: mono-, di- and tri- methyl and ethyl amines, tetramethyl (or ethyl) ammonium hydroxide, triethanolamine, morpholine, cyclohexylamines, benzylamine and their derivatives. It is to be understood that all amine bases, that is, any alkyl- or aryl amines and/or their derivatives showing basic reactions by themselves or as aqueous solutions may be equally well used.

Various soap forming acids such as oleic, recinoleic, stearic, palmitic or abietic acid may be used in conjunction with any of the substances above mentioned. The soaps are either formed prior to their incorporation into the stock, to be dispersed or in situ during the dispersing operation.

Such soap mixtures give very stable dispersions of the above mentioned materials and such dispersions are still reasonably fluid up to about 75% concentration. Moreover, such dispersions mix readily and in any desired proportion with natural latices. Furthermore, owing to the oily nature of the mixtures of some of the above organic bases with the alkali silicates and/or borates, and/or alkali metal hydroxides, their incorporation into the stock to be dispersed requires, as a rule, much less time than is necessary in the case when only alkali metal hydroxides are used.

Here are a few specific examples of carrying the invention into effect, all parts being by weight:

Example 1

100 parts of pale crepe or smoked sheet or softened rubber or guayule or rubber reclaim are gradually introduced into a preheated internal mixer, e. g. a Werner and Pfleiderer, and masticated, keeping the machine warm until the mass becomes plastic and completely uniform. 5-10 parts of a plasticizer such as, e. g., mineral oil or preferably of a plasticiser tackifier such as, e. g., pine tar, coal tar distillation products, pool aromatic extracts (vibads, hibads, ravolens, etc.) or still better proprietary compositions such as, e. g., biltacs or Naftolens are now introduced into the masticator together with 5 parts of oleic acid and thoroughly mixed. 10-25 parts of water are now added and when this is properly absorbed, there are gradually added:

(a) 1.0 part of triethanolamine, and 2.0 parts of sodium silicate (140° Twaddell), or
(b) 1.25 parts of triethanolamine and 0.5 part of sodium hydroxide, or
(c) 1.25 parts of triethanolamine, 0.25 part of sodium hydroxide, and 0.75 part of sodium silicate (140° Twaddell).

During this addition the batch, which up to now looked like ordinary masticated rubber or rubber reclaim, changes its appearance. It becomes sticky, loses its toughness and is no longer elastic. The inversion has taken place, i. e., the water that was originally the dispersed phase has become now the continuous phase.

All that is necessary now is to add water—as fast as taken up—to obtain the desired final concentration of the dispersion.

Any protective colloids and/or stabilisers may be added now or before the final addition of water.

If desired, the resulting dispersion may be compounded and vulcanized in any known or preferred manner.

Example 2

100 parts of a synthetic rubber, such as, e. g., GR-S (rubbery copolymers of butadiene and styrene) or GR-I (rubbery copolymers of iso-butylene and a conjugated diolefin) or GR-N (polychloroprene) or GR-P olefin polysulphides are introduced into a preheated internal mixer and masticated with addition of 10–25 parts of a suitable plasticiser or preferably of a plasticiser tackifier such as, e. eg., described in Example 1, until the mass becomes completely uniform. 5 parts of oleic acid are now added, followed by 10–25 parts of water. When this is properly absorbed there are gradually added:

(a) 1.0 part of cyclohexylamine and 1.5 parts of sodium silicate (140° Twaddell), or
(b) 1.0 part of cylohexylamine and 0.35 part of potassium hydroxide, or
(c) 1.0 part of cyclohexylamine, 0.2 part of sodium hydroxide, 0.5 part of sodium silicate (140° Twaddell) and 0.25 part of ammonia.

As in Example 1, a change of phase occurs during this operation and the resulting aqueous dispersion of the synthetic rubber may now be diluted and stabilised and, if desired, compounded and vulcanised in any desired or preferred manner.

Example 3

100 parts of vulcanised rubber waste are introduced into a preheated internal mixer with addition of reclaiming agents such as rosin, estergum, coumarone resin, asymmetric aromatic hydrazines (such as phenyl hydrazine) or the like and masticated at an elevated temperature, until the reclaiming is finished, i. e. the mass becomes homogeneous.

5 parts of abietic acid are masticated into the mix and 15–25 parts of water are added.

When the water is properly absorbed there are gradually added:

(a) 1.25 parts of benzylamine and 1.0 part of sodium silicate (140° Twaddell) or,
(b) 1.0 part of benzylamine, 0.25 part of sodium hydroxide and 0.25 part of ammonia (d=.880), or
(c) 1.25 parts of benzylamine, 0.1 part of sodium hydroxide, 0.5 part of borax and 0.25 part of ammonia (d=.880).

As in Example 1 a change of phase occurs now and the resulting aqueous reclaim dispersion may now be diluted and stabilised and, if desired, compounded and vulcanised in any known or preferred manner.

Example 4

100 parts of a dark or white substitute (factice) are introduced into a preheated internal mixer and masticated until homogeneous. 5 parts of a suitable plasticiser or preferably of a plasticiser tackifier, such as, e. g., described in Example 1, and 5 parts of oleic acid are mixed in and when properly taken up, 30 parts of water are added. After the water has been properly absorbed there are slowly added:

(a) 2.0 parts of triethanolamine and 1.0 part of sodium silicate (140° Twaddell) or,
(b) 1.75 parts of triethanolamine and 0.25 part of sodium hydroxide, or
(c) 1.0 part of triethanolamine, 0.25 part of sodium hydroxide, and 1.0 part of sodium silicate (140° Twaddell).

As in the previous examples a change of phase takes place during this addition and all that is necessary now is to dilute the obtained aqueous dispersion if desired, and to stabilise it if necessary.

It will be noted that in the preceding examples the inorganic alkali compounds are present in less than equimolecular proportions with respect to the soap-forming acid component of the mixtures. This ensures the presence both of an inorganic alkali soap and of a soap of the amine base in the dispersions, since the inorganic alkali compound is present in a quantity insufficient to saponify all of the soap-forming acid.

I claim:

1. In the manufacture of artificial aqueous dispersions of a plasticizable material within the group consisting of natural rubber; rubbery copolymers of butadiene and styrene; rubbery copolymers of iso-butylene and a conjugated diolefin; polychloroprene; olefin polysulphides; factice; and the foregoing materials respectively in vulcanized condition; and reclaims of the respective foregoing materials; the process which comprises masticating such a material in plasticized-solid state in the presence of a small amount of a soap-forming acid saponified in part by an amine base and in part by an inorganic alkali metal compound, and adding sufficient water to produce a dispersion.

2. The process of claim 1 wherein the material is heated and mixed with a plasticizer to produce a more plastic mass during the mastication.

3. In the manufacture of artificial aqueous dispersions of a plasticizable material within the group consisting of natural rubber; rubbery copolymers of butadiene and styrene; rubbery copolymers of iso-butylene and a conjugated diolefin, polychloroprene; olefin polysulphides; factice; the foregoing materials respectively in vulcanized condition; and reclaims of the respective foregoing materials; the process which comprises masticating such a material in the plasticized-solid state with a small amount of a soap-forming acid saponified in part by an amine base and in part by an inorganic alkali metal compound, the quantity of inorganic alkali metal compound employed being insufficient to convert all of said soap forming acid into an inorganic alkali soap, and adding sufficient water during the mastication to produce a dispersion.

4. In the manufacture of artificial aqueous dispersions of a plasticizable material within the group consisting of natural rubber; rubbery copolymers of butadiene and styrene; rubbery copolymers of iso-butylene and a conjugated diolefin; polychloroprene; olefin polysulphides; factice; the foregoing materials respectively in vulcanized condition; and reclaims of the respective foregoing materials; the process which comprises heating and masticating such a material in the plasticized-solid state in the presence of a small amount of plasticizing agent and a soap-forming acid until a more plastic mass is produced, adding a small amount of an amine base, a small amount of an inorganic alkali metal compound, and sufficient water to disperse the mixture, and continuing the mastication until dispersion takes place, the quantity of inorganic alkali metal compound added being in less than equimolecular proportions with respect to the soap-forming acid.

5. In the manufacture of artificial aqueous dispersions of a plasticizable material within the group consisting of natural rubber; rubbery copolymers of butadiene and styrene; rubbery copolymers of iso-butylene and a conjugated di-olefin, polychloroprene; olefin polysulphides; factice; the foregoing materials respectively in vulcanized condition; and reclaims of the respective foregoing materials; the process which comprises heating and masticating the material, in vulcanized condition and as a plasticizable solid, in the presence of a small amount of a reclaiming agent for such vulcanized waste material, until a homogeneous, plastic mass is produced, and adding a soap forming acid saponified in part by an amine base and in part by an inorganic alkali metal compound, in the presence of sufficient water to produce a dispersion, the quantity of inorganic alkali metal compound employed being in less than equimolecular proportions with respect to said soap-forming acid.

NAUM TALALAY.

REFERENCES CITED

The following references are of record in the file of this patent:

UNITED STATES PATENTS

| Number | Name | Date |
| --- | --- | --- |
| 2,265,364 | Fowler | Dec. 9, 1941 |
| 2,280,830 | Johnson | Apr. 28, 1942 |
| 2,290,794 | Alvarado | July 21, 1942 |
| 2,313,144 | Gomm | Mar. 9, 1943 |

FOREIGN PATENTS

| Number | Country | Date |
| --- | --- | --- |
| 490,781 | Great Britain | Aug. 22, 1938 |